(12) United States Patent
Tsai

(10) Patent No.: US 6,401,966 B2
(45) Date of Patent: Jun. 11, 2002

(54) PLASTIC PRESSURE VESSEL STRUCTURE

(76) Inventor: Fu Chung Tsai, No. 22, Lane 180, Sec. 3, Min-Sheng Road, Ta Ya Hsiang, Taichung Hsien (TW)

( * ) Notice: Subject to any disclaimer, the term of this patent is extended or adjusted under 35 U.S.C. 154(b) by 0 days.

(21) Appl. No.: 09/829,956

(22) Filed: Apr. 11, 2001

Related U.S. Application Data

(63) Continuation-in-part of application No. 09/576,525, filed on May 23, 2000.

(51) Int. Cl.⁷ ................................................ F16L 55/04
(52) U.S. Cl. ........................ 220/723; 220/4.12; 220/530
(58) Field of Search ................................ 220/723, 4.07, 220/4.12, 4.13, 4.21, 426, 530; 138/30

(56) References Cited

U.S. PATENT DOCUMENTS

| | | | | |
|---|---|---|---|---|
| 2,880,759 A | * | 4/1959 | Wisman | 220/723 X |
| 3,165,229 A | * | 1/1965 | Paul | 220/530 X |
| 4,595,037 A | * | 6/1986 | LeBreton et al. | 220/530 X |
| 4,667,841 A | * | 5/1987 | Belle | 220/4.12 X |
| 4,817,830 A | * | 4/1989 | Yavorsky | 220/723 X |
| 5,386,925 A | * | 2/1995 | Lane | 220/4.12 X |
| 6,041,820 A | * | 3/2000 | Boehme | 220/723 X |

* cited by examiner

Primary Examiner—Steven Pollard
(74) Attorney, Agent, or Firm—Rosenberg, Klein & Lee

(57) ABSTRACT

A plastic pressure vessel structure includes a diaphragm mounted in a plastic outer barrel for dividing the plastic outer barrel into an upper chamber containing a liquid, and a lower chamber containing a pressurized gas, and a plastic inner barrel fully mounted in the lower chamber. In such a manner, the wall of the inner barrel and the wall of the lower chamber are overlapped with each other, such that capillary pores of the wall of the inner barrel and capillary pores of the wall of the lower chamber are arranged in a staggered manner, thereby reducing the capillary action, so as to provide a tight sealing effect in the lower chamber, thereby preventing the pressurized gas contained in the lower chamber from leaking outward, and thereby preventing the pressure contained in the lower chamber from being reduced.

12 Claims, 4 Drawing Sheets

PLASTIC PRESSURE VESSEL STRUCTURE

CROSS-REFERENCES TO RELATED APPLICATIONS

The present invention is a continuation-in-part (C.I.P.) application of the co-pending U.S. Ser. No. 09/576,525, filed on May 23, 2000.

BACKGROUND OF THE INVENTION

1. Field of the Invention

The present invention relates to a plastic pressure vessel structure, and more particularly to a plastic pressure vessel structure that can provide an efficient sealing effect.

2. Description of the Related Art

The closest prior art of which the applicant is aware is disclosed in U.S. Pat. No. 5,062,455 to Schurter et al., filed on Aug. 25, 1989, entitled "PRESSURE VESSEL WITH DIAPHRAGM COMPRESSION SEAL". In the reference, it disclosed a pressure vessel 10 comprising upper and lower vessel shells 12 and 14 having facing open mouths received one within the other in a partially overlapping telescoped relation. The upper shell 12 has a lower wall section 16 received within and overlapping an upper wall section 18 of the lower shell 14. A resilient flexible diaphragm 20 is disposed within the vessel and separates the latter into variable volume chambers 22 and 24.

SUMMARY OF THE INVENTION

The primary objective of the present invention is to provide a plastic pressure vessel structure that can reduce the capillary phenomenon largely, so as to provide an efficient sealing effect.

In accordance with the present invention, there is provided a plastic pressure vessel structure, comprising:

a plastic outer barrel;

a diaphragm mounted in the plastic outer barrel for dividing the plastic outer barrel into an upper chamber containing a liquid therein, and a lower chamber containing a pressurized gas therein; and a plastic inner barrel fully mounted in the plastic outer barrel and located in the lower chamber of the plastic outer barrel;

wherein, a wall of the plastic inner barrel and a wall of the lower chamber of the plastic outer barrel are overlapped with each other, such that capillary pores of the wall of the plastic inner barrel and capillary pores of the wall of the lower chamber of the plastic outer barrel are arranged in a staggered manner, thereby reducing a capillary action, so as to provide a tight sealing effect in the lower chamber of the plastic outer barrel, thereby preventing the pressurized gas contained in the lower chamber of the plastic outer barrel from leaking outward, and thereby preventing a pressure contained in the lower chamber of the plastic outer barrel from being reduced.

Further benefits and advantages of the present invention will become apparent after a careful reading of the detailed description with appropriate reference to the accompanying drawings.

DETAILED DESCRIPTION OF THE INVENTION

Figure 1:
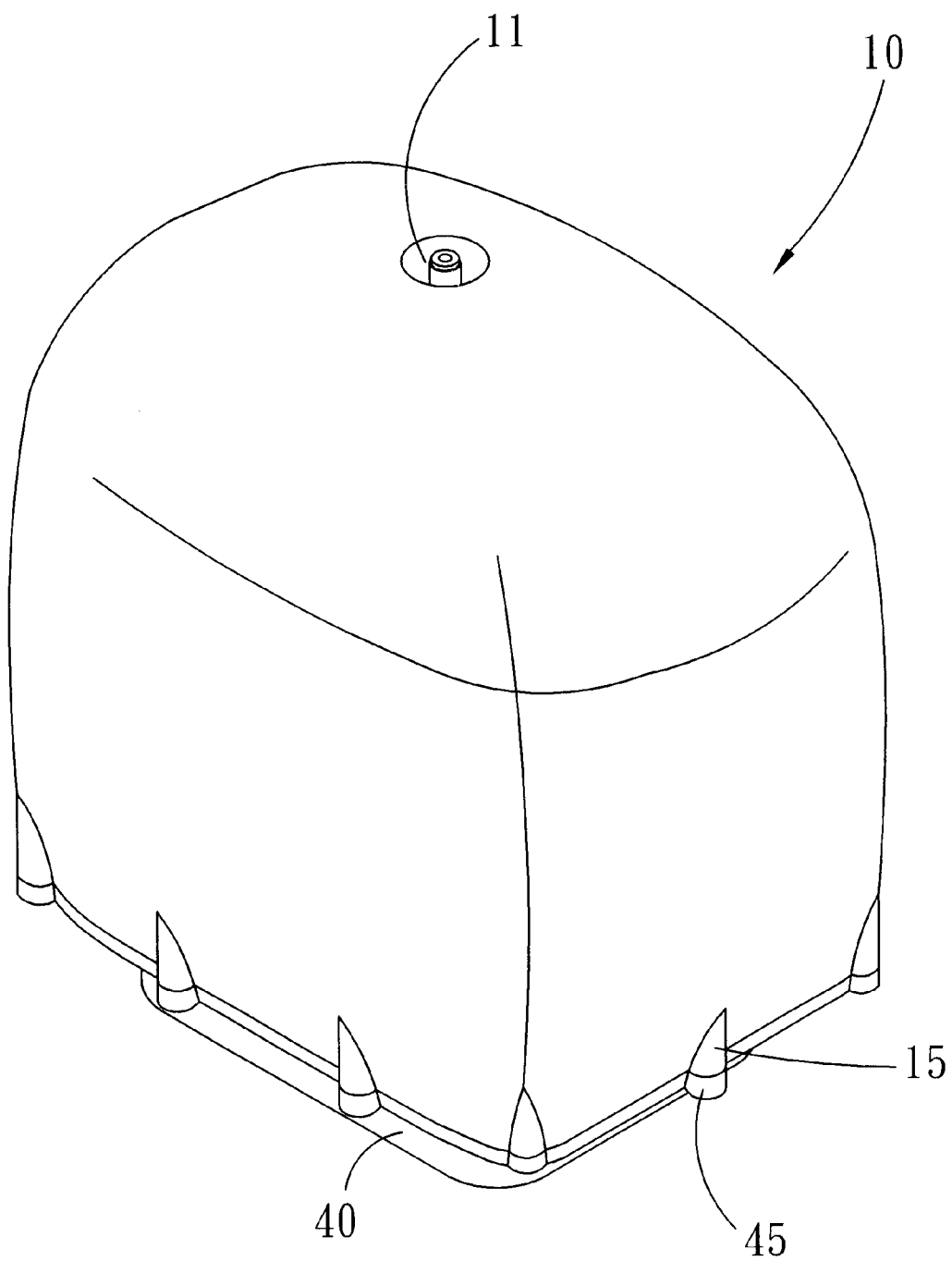
FIG. 1 is a perspective view of a plastic pressure vessel structure in accordance with the present invention.
Figure 2:
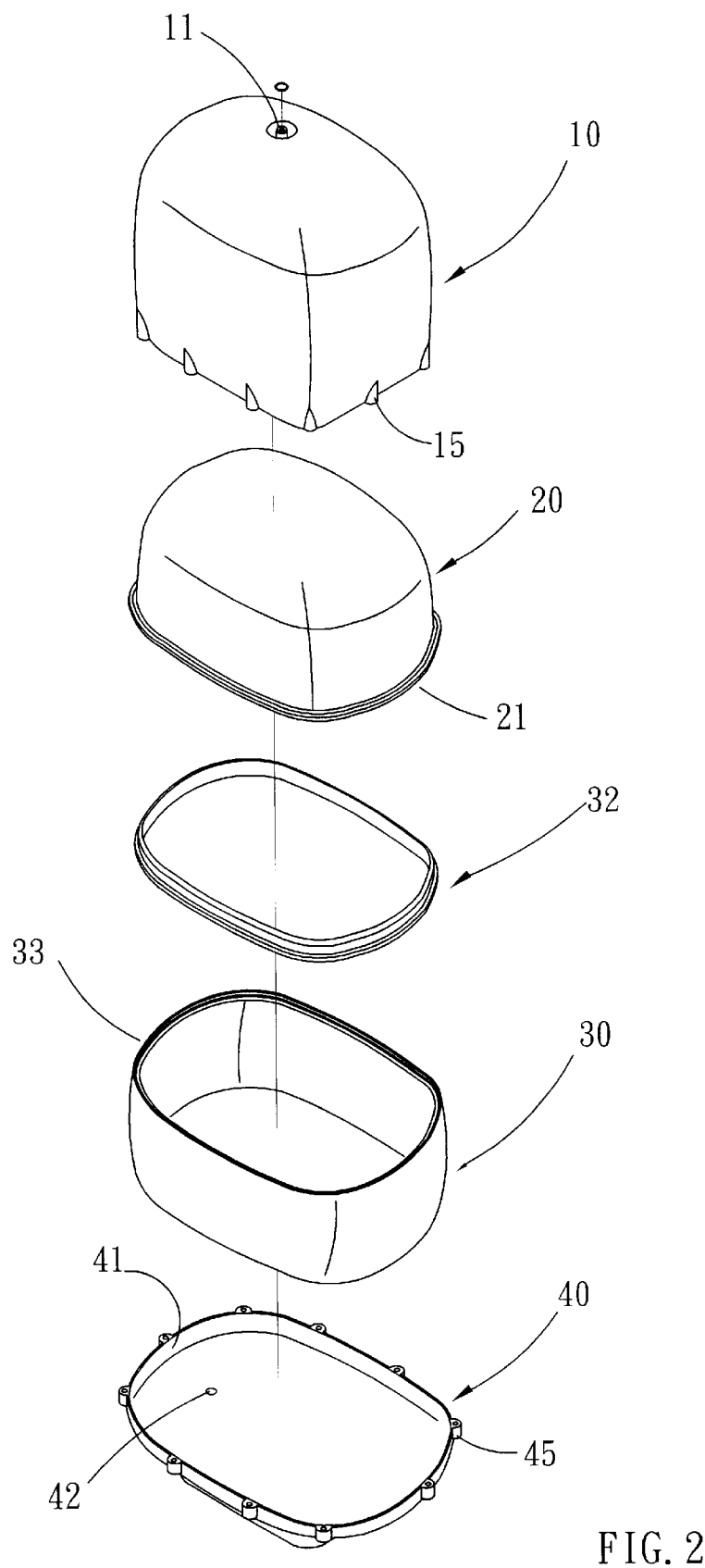
FIG. 2 is an exploded perspective view of the plastic pressure vessel structure as shown in FIG. 1.
Figure 3:
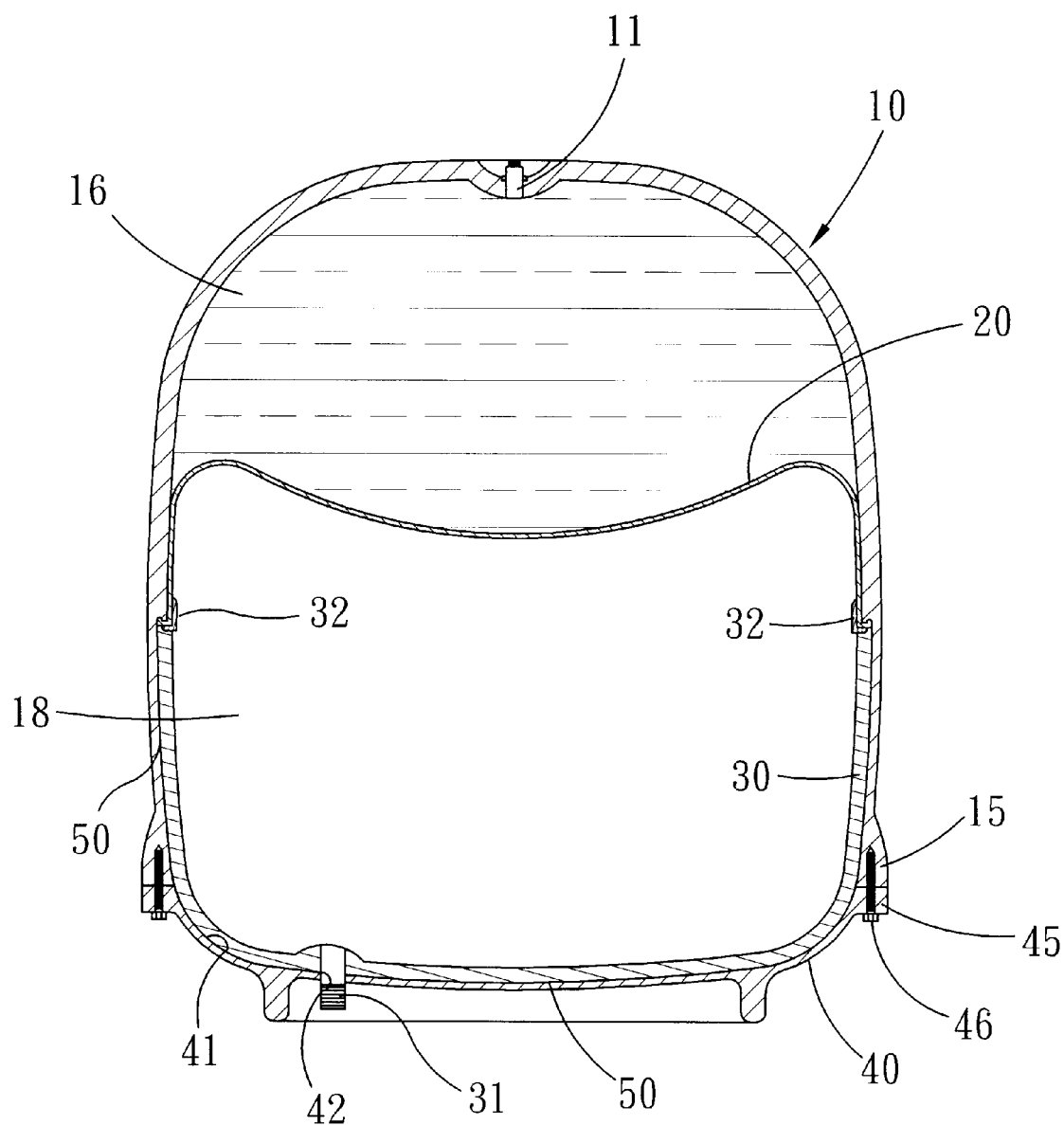
FIG. 3 is a front plan cross-sectional view of the plastic pressure vessel structure as shown in FIG. 1.
Figure 4:
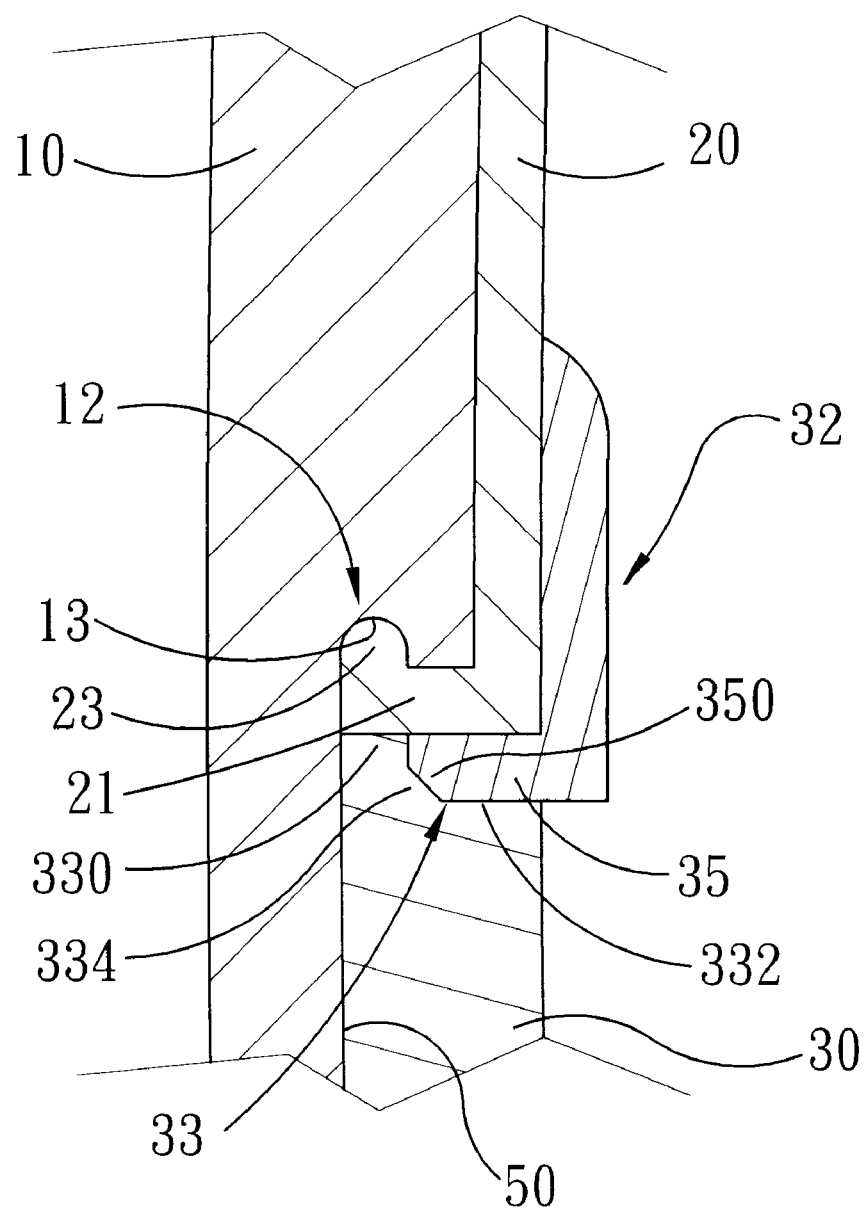
FIG. 4 is a partially cut-away enlarged view of the plastic pressure vessel structure as shown in FIG. 3.

Referring to the drawings and initially to FIGS. 1–3, a plastic pressure vessel structure in accordance with the present invention comprises a plastic outer barrel 10, a diaphragm 20 mounted in the plastic outer barrel 10 for dividing the plastic outer barrel 10 into an upper chamber 16 containing a liquid therein, and a lower chamber 18 containing a pressurized gas therein, and a plastic inner barrel 30 fully mounted in the plastic outer barrel 10 and located in the lower chamber 18 of the plastic outer barrel 10.

By such an arrangement, the wall of the plastic inner barrel 30 and the wall of the lower chamber 18 of the plastic outer barrel 10 are overlapped with each other, such that the capillary pores of the wall of the plastic inner barrel 30 and the capillary pores of the wall of the lower chamber 18 of the plastic outer barrel 10 are arranged in a staggered manner, thereby reducing a capillary action therebetween, so as to provide a tight sealing effect in the lower chamber 18 of the plastic outer barrel 10, thereby efficiently preventing the pressurized gas contained in the lower chamber 18 of the plastic outer barrel 10 from leaking outward, and thereby preventing the pressure contained in the lower chamber 18 of the plastic outer barrel 10 from being reduced gradually.

The top portion of the plastic outer barrel 10 defines a water inlet 11 for filling water into the upper chamber 16 of the plastic outer barrel 10. The plastic outer barrel 10 has an opened bottom portion, and the plastic pressure vessel structure further comprises a base 40 secured on the bottom portion of the plastic outer barrel 10 for supporting the plastic inner barrel 30 and the plastic outer barrel 10.

The bottom portion of the plastic outer barrel 10 has a periphery provided with a plurality of ears 15, the base 40 has a periphery provided with a plurality of ribs 45, and the plastic pressure vessel structure also comprises a plurality of locking screws 46 each in turn extended through a respective ear 15 of the plastic outer barrel 10, and each screwed in a respective rib 45 of the base 40, thereby securing the plastic outer barrel 10 on the base 40.

The base 40 defines a receiving space 41 for receiving the lower portion of the plastic inner barrel 30. The base 40 also defines a through hole 42 for allowing passage of the gas filling nozzle 31 mounted on the bottom portion of the plastic inner barrel 30, so that the pressurized gas can be filled into the lower chamber 18 of the plastic outer barrel 10.

An isolation layer 50 is coated between the plastic inner barrel 30 and the plastic outer barrel 10 and between the plastic inner barrel 30 and the base 40. Preferably, the isolation layer 50 includes water, an adhesive glue, or the like.

Referring to FIGS. 1–4, the mediate portion of the plastic outer barrel 10 has an inner wall provided with a first locking flange 12. The first locking flange 12 defines an annular locking groove 13. The diaphragm 20 has a bottom portion provided with a second locking flange 21 rested on the first locking flange 12. The second locking flange 21 is provided with a hook 23 snapped in the locking groove 13 of the first locking flange 12.

A retainer 32 is mounted between the diaphragm 20 and the plastic inner barrel 30. The plastic inner barrel 30 has a top portion 33 formed with a support rim 330 rested on the second locking flange 21 of the diaphragm 20. The top portion 33 of the plastic inner barrel 30 defines a receiving groove 332. The retainer 32 has a bottom portion formed with an urging flange 35 received in the receiving groove 332 of the top portion 33 of the plastic inner barrel 30 and urged between the second locking flange 21 of the diaphragm 20 and the top portion 33 of the plastic inner barrel 30. The urging flange 35 of the retainer 32 is provided a first tapered surface 350, and the receiving groove 332 of the top portion 33 of the plastic inner barrel 30 is provided with a second tapered surface 334 urged on the first tapered surface 350 of the urging flange of the retainer 32.

In assembly, the diaphragm 20 is inserted into the plastic outer barrel 10. The second locking flange 21 is rested on the first locking flange 12, while the hook 23 of the second locking flange 21 is snapped into the locking groove 13 of the first locking flange 12, such that the diaphragm 20 is secured in the plastic outer barrel 10. The retainer 32 is then inserted into the diaphragm 20 with the urging flange 35 being urged on the second locking flange 21 of the diaphragm 20. The plastic inner barrel 30 is then inserted into the plastic outer barrel 10, whereby the support rim 330 of the top portion 33 of the plastic inner barrel 30 is rested on the second locking flange 21 of the diaphragm 20, while the urging flange 35 of the retainer 32 is received in the receiving groove 332 of the top portion 33 of the plastic inner barrel 30, and is urged between the second locking flange 21 of the diaphragm 20 and the top portion 33 of the plastic inner barrel 30.

The first tapered surface 350 of the urging flange 35 of the retainer 32 may co-operate with the second tapered surface 334 of the receiving groove 332 of the top portion 33 of the plastic inner barrel 30, thereby facilitating the combination of the urging flange 35 of the retainer 32 with the top portion 33 of the plastic inner barrel 30, such that the plastic inner barrel 30, the retainer 32, the plastic outer barrel 10, and the diaphragm 20 are securely engaged with each other, thereby forming a secure combination of the plastic pressure vessel structure.

Accordingly, in accordance with the plastic pressure vessel structure of the present invention, the wall of the lower chamber 18 is formed by wall of the plastic inner barrel 30 overlapping the wall of the plastic outer barrel 10, such that the capillary pores of the wall of the plastic inner barrel 30 and the capillary pores of the wall of the plastic outer barrel 10 are arranged in a staggered manner, thereby greatly reducing the capillary action therebetween, so as to provide a tight sealing effect in the lower chamber 18 of the plastic outer barrel 10, thereby efficiently preventing the pressurized gas contained in the lower chamber 18 of the plastic outer barrel 10 from leaking outward, and thereby preventing the pressure contained in the lower chamber 18 of the plastic outer barrel 10 from being reduced. Thus, the pressure contained in the lower chamber 18 of the plastic outer barrel 10 is not easily reduced, thereby reducing the times of filling the pressurized gas into the lower chamber 18 of the plastic outer barrel 10.

In addition, the isolation layer 50 is coated on the outer wall of the plastic inner barrel 30, the inner wall of the plastic outer barrel 10, and the inner wall of the base 40, so that the isolation layer 50 can infiltrate into and block the capillary pores of the plastic outer barrel 10, the plastic inner barrel 30, and the base 40, thereby eliminating the possibility of the pressurized gas leaking outward from the lower chamber 18 of the plastic outer barrel 10 due to the capillary phenomenon.

Further, the plastic pressure vessel structure of the present invention is detachable by removing the base 40, so that the parts of the plastic pressure vessel structure can be washed cleaned easily.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A plastic pressure vessel structure, comprising:
    a plastic outer barrel (10);
    a diaphragm (20) mounted in said plastic outer barrel (10) for dividing said plastic outer barrel (10) into an upper chamber (16) containing a liquid therein, and a lower chamber (18) containing a pressurized gas therein; and
    a plastic inner barrel (30) fully mounted in said plastic outer barrel (10) and located in said lower chamber (18) of said plastic outer barrel (10);
    wherein, a wall of said plastic inner barrel (30) and a wall of said lower chamber (18) of said plastic outer barrel (10) are overlapped with each other, such that capillary pores of said wall of said plastic inner barrel (30) and capillary pores of said wall of said lower chamber (18) of said plastic outer barrel (10) are arranged in a staggered manner, thereby reducing a capillary action, so as to provide a tight sealing effect in said lower chamber (18) of said plastic outer barrel (10), thereby preventing said pressurized gas contained in said lower chamber (18) of said plastic outer barrel (10) from leaking outward, and thereby preventing a pressure contained in said lower chamber (18) of said plastic outer barrel (10) from being reduced.

2. The plastic pressure vessel structure in accordance with claim 1, wherein said plastic outer barrel (10) has an inner wall provided with a first locking flange (12), said first locking flange (12) defines an annular locking groove (13), said diaphragm (20) has a bottom portion provided with a second locking flange (21) rested on said first locking flange (12), said second locking flange (21) is provided with a hook (23) snapped in said locking groove (13) of said first locking flange (12).

3. The plastic pressure vessel structure in accordance with claim 2, further comprising a retainer (32) mounted between said diaphragm (20) and said plastic inner barrel (30).

4. The plastic pressure vessel structure in accordance with claim 3, wherein said plastic inner barrel (30) has a top portion (33) formed with a support rim (330) rested on said second locking flange (21) of said diaphragm (20), said top portion (33) of said plastic inner barrel (30) defines a receiving groove (332), and said retainer (32) has a bottom portion formed with an urging flange (35) received in said receiving groove (332) of said top portion (33) of said plastic inner barrel (30) and urged between said second locking flange (21) of said diaphragm (20) and said top portion (33) of said plastic inner barrel (30).

5. The plastic pressure vessel structure in accordance with claim 4, wherein said urging flange (35) of said retainer (32) is provided a first tapered surface (350), and said receiving groove (332) of said top portion (33) of said plastic inner barrel (30) is provided with a second tapered surface (334) urged on said first tapered surface (350) of said urging flange (35) of said retainer (32).

6. The plastic pressure vessel structure in accordance with claim 1, further comprising an isolation layer (50) coated between said plastic inner barrel (30) and said plastic outer barrel (10).

7. The plastic pressure vessel structure in accordance with claim 1, wherein said isolation layer (50) is an adhesive glue.

8. The plastic pressure vessel structure in accordance with claim 1, wherein said plastic outer barrel (10) has an opened bottom portion, and said plastic pressure vessel structure further comprises a base (40) secured on said bottom portion of said plastic outer barrel (10) for supporting said plastic inner barrel (30).

9. The plastic pressure vessel structure in accordance with claim 8, wherein said bottom portion of said plastic outer barrel (10) has a periphery provided with a plurality of ears (15), said base (40) has a periphery provided with a plurality of ribs (45), and said plastic pressure vessel structure further comprises a plurality of locking screws (46) each in turn extended through a respective ear (15) of said plastic outer barrel (10), and each screwed in a respective rib (45) of said base (40).

10. The plastic pressure vessel structure in accordance with claim 8, wherein said base (40) defines a receiving space (41) for receiving a lower portion of said plastic inner barrel (30).

11. The plastic pressure vessel structure in accordance with claim 8, further comprising an isolation layer (50) coated between said plastic inner barrel (30) and said base (40).

12. The plastic pressure vessel structure in accordance with claim 11, wherein said isolation layer (50) is an adhesive glue.

\* \* \* \* \*